April 1, 1969     C. F. RIVERS     3,435,695
SHEAR PIN SAFETY HUB
Filed July 19, 1967
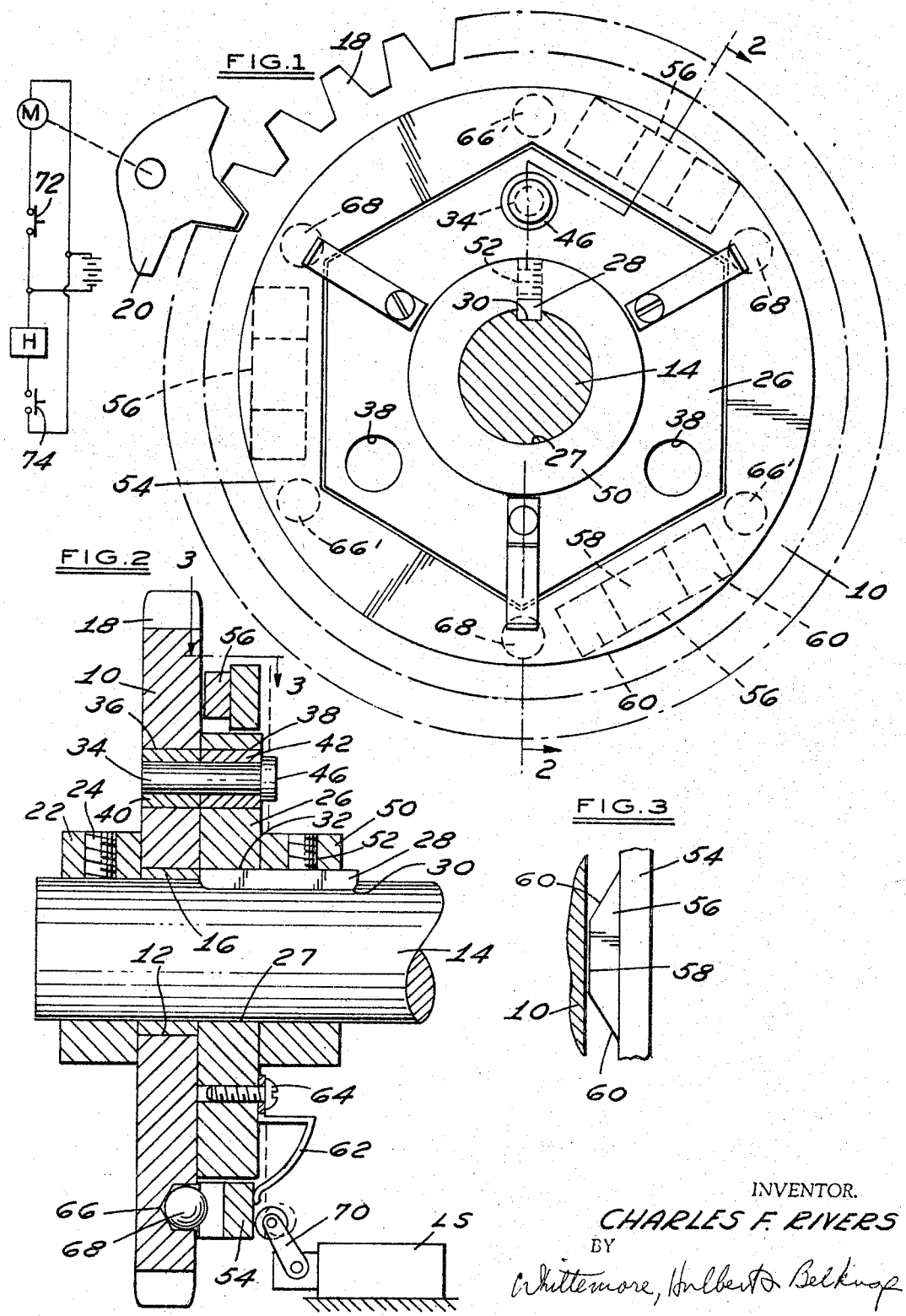
INVENTOR.
CHARLES F. RIVERS
BY
Whittemore, Hulbert & Belknap
ATTORNEYS

United States Patent Office 3,435,695
Patented Apr. 1, 1969

1

3,435,695
SHEAR PIN SAFETY HUB
Charles F. Rivers, 15318 Warwick,
Detroit, Mich. 48223
Filed July 19, 1967, Ser. No. 654,641
Int. Cl. F16h *13/02*
U.S. Cl. 74—412     10 Claims

ABSTRACT OF THE DISCLOSURE

The device comprises a rotary driving member and a rotary driven member. A shear pin connects the members to transmit rotation from the driving member to the driven member. An operating member or plate on the driven member is constrained to rotate with the driven member but is capable of shifting axially. The operating member has angularly spaced cams, and the driving member carries balls in recesses respectively located between the cams. If for any reason the pin should shear, the driving member rotates relative to the driven member causing the balls to ride over the cams with a rolling action thereby axially shifting the operating member. Axial shifting of the operating member operates a limit switch to deactuate the power means for the driving member.

Summary of the invention

It is an essential object of the invention to provide a relatively simple low cost yet improved shear pin safety hub.

Another object of the invention is to provide a device for shutting off the power to the driving member when the pin shears after only a very limited subsequent rotation of the driving member.

Another object is to provide a device of the character described which can be used for either clockwise or counterclockwise operation.

Another object is to provide balls for shifting the operating member which have a rolling action as they move over the cams on the operating member.

Another object is to provide a plurality of cams and balls for axially shifting the operating member, which are spaced at equal intervals circumferentially of the driving and driven members.

Other objects and features of the invention will become apparent as the description proceeds, especially when taken in conjunction with the accompanying drawings, wherein:

FIGURE 1 is a side elevational view, with parts in section, of a device embodying my invention.

FIGURE 2 is a sectional view taken on the line 2—2 of FIGURE 1.

FIGURE 3 is a fragmentary view, partly in section, taken on the line 3—3 of FIGURE 2.

Referring now more particularly to the drawing, the device shown in FIGURES 1 and 2 comprises a driving member 10 which is in the form of a flat circular plate having a central aperture 12 journaled on shaft 14 for rotation by a bearing 16. The driving member 10 is adapted to be driven by any suitable means and for this purpose may for example be a gear or a grooved pulley or a sprocket. In the present instance, the member 10 is shown as being a gear having teeth 18 on its periphery so as to be driven by a suitable source of power including in this instance the motor M and pinion 20 in mesh with the gear teeth 18. A collar 22 secured on shaft 14 by set screw 24 prevents the driving member 10 from moving to the left as viewed in FIGURE 2.

The numeral 26 designates the driven member which is in the form of a flat plate having a central opening 27 through which the shaft 14 extends. The driven member 26 is keyed to the shaft 14 by key 28 which is disposed in a longitudinal slot 30 in the shaft and in a transverse slot 32 in the driven member 26. The central axes of the driving member 10 and driven member 26 coincide with the axis of rotation of shaft 14.

Rotation is transmitted from the driving member 10 to the driven member 26 by a shear pin 34. As seen in FIGURE 2, the driving and driven members have aligned or registering holes 36 and 38, and bushings 40 and 42 are disposed in the holes. The shear pin extends into the aligned central passages of the bushings 40 and 42. The shear pin may be secured in the position shown by any suitable means, or no means need be employed for this purpose, the torque applied to the pin during transmission of rotation from the driving member to the driven member being sufficient to prevent the shear pin from dropping out of place. The shear pin as shown has a head 46 by means of which the pin may be inserted and withdrawn.

FIGURE 1 shows that the driven member 26 has three equally angularly spaced holes 38. Actually only one such hole is required. However, additional holes have been formed in the driven member to make it easier to align one of the holes 38 with the hole 36 in the driving member for insertion of the shear pin 34.

A collar 50 is secured on the shaft 14 by a set screw 52 preventing movement of the driving member and driven member 10 and 26 to the right in FIGURE 2. Hence the driving and driven members are confined axially to the position shown in FIGURE 2 by the collars 22 and 50.

The outer margin of the driven member is in the form of a regular hexagon as shown in FIGURE 1, having the six flat sides as shown. In a broad sense the outline of the outer margin of the driven member may be of any non-circular form. There is an annular operating member 54 surrounding the driven member 26. The inner margin of the operating member 54 is of the same noncircular form as the outer margin of the driven member, in this instance having the shape of a regular hexagon. Accordingly, the operating member 54 cannot rotate relative to the driven member 26. However, the operating member may shift axially relative to the driven member.

On the face of the operating member adjacent the driving member 10, there are provided three equally circumferentially spaced cams 56. The cams are elongated circumferentially and have the flat central surfaces 58 parallel to the adjacent face of the driving member, and the inclined ramp surfaces 60 at both ends. Leaf springs 62 secured to the driven member 26 by screws 64 urge the operating member 54 to the left in FIGURE 2, causing the flat surfaces 58 of the cams to approach and if desired actually contact the adjacent face of the driving member 10.

The face of the driving member 10 adjacent to the operating member 54 is provided with three equally circumferentially spaced circular recesses 66. The recesses 66 are respectively located between the cams 56. These recesses are circumferentially aligned with the cams and there is a ball 68 freely rotatably received in each recess. When the balls are fully seated in the recesses, they project from the recesses a distance less than their radii. In the normal operating position of the parts with the cams 56 substantially in contact with the adjacent face of the driving member 10, the operating member 54 is spaced from the adjacent face of the driving member 10 a distance less than the diameter of the balls so that the balls cannot accidentally fall out of the recesses.

In operation, with power applied to the driving member 10 through the pinion 20, rotation will be transmitted from the driving member 10 to the driven member 26 by the shear pin 34 to rotate the shaft 14. The shaft 14 will normally be connected to a load of any description. If for any reason such as an overload on the shaft 14, the shear pin should fail or shear, the driving member 10 will continue to rotate but the load on the driven member 26 will cause the driven member to stop. The balls 68 will thereupon ride up the adjacent ramp surfaces 60 of the cams 56 with a rolling action, causing the operating member 54 to move to the dotted line position in FIGURE 2. Such axial movement of the operating member 54 will turn the lever 70 of the limit switch LS. The limit switch LS has a normally closed contact 72 in the circuit for the motor M and, when the lever 70 is thus turned, it will open contact 72 to de-actuate the motor and thereby stop the rotation of the driving member 10. Preferably, there will also be a signal device to provide a visual and/or audible signal when the motor M is de-actuated. For this purpose a horn H may be provided in the control circuit. Under normal conditions during the operation of the device this horn is not operated. However, when the lever 70 of limit switch LS is turned to open contact 72 and deactuate the motor, the normally open limit switch contact 74 is closed to energize the horn to sound a signal to the operator.

The device shown in the drawing is designed particularly for counterclockwise rotation in FIGURE 1. The balls 68 are located close to one side of the cams 56 so that upon failure of the shear pin the balls do not have far to go before they ride up on the cams and shift the operating member 54 to shut off the power to the driving member 10. The balls are capable of riding up the cams from either side, however, in response to rotation of the driving member 10 relative to the driven member 26 in either direction.

To make the device more suitable for clockwise rotation, the face of the driving member 10 adjacent to the operating member 54 is preferably provided with three additional ball receiving recesses 66′. These ball receiving recesses 66′ are seen in FIGURE 1 to be equally circumferentially spaced and located on the opposite side of the cams 56 from the recesses 66. Thus for clockwise rotation the balls 68 may be removed from the recesses 66 and inserted in the recesses 66′ so that the balls will not have far to travel before they ride up the cams when the pin 34 shears. Thus the device will operate the limit switch LS to shut off the drive motor M when the pin shears after only a very limited subsequent rotation of the driving member 10.

What I claim as my invention is:

1. In combination, a rotary driving member, power means for rotating said driving member, a rotary driven member adjacent to and on a common axis with said driving member, a shear pin connecting said members to transmit rotation from said driving to said driven member, the outer margin of said driven member being of non-circular form, an annular operating member having an inner margin of substantially the same noncircular form as and nonrotatably, axially slidably fitted on the outer margin of said driven member, means for axially shifting said operating member in one direction in response to rotation of said driving member relative to said driven member when said pin shears including a cam on said operating member and a projection on said driving member, said cam and projection being circumferentially aligned so that said projection will ride over said cam and axially shift said operating member as aforesaid when said driving member rotates relative to said driven member, and means responsive to the aforesaid axial shift of said operating member for deactuating said power means.

2. The combination defined in claim 1, wherein said cam has beveled ramp surfaces at both ends so that said projection can ride over said cam from either end irrespective of the direction of rotation of said driving member relative to said driven member.

3. The combination defined in claim 2, wherein spring means are provided normally urging said operating member axially in the opposite direction.

4. In combination, a rotary driving member, power means for rotating said driving member, a rotary driven member adjacent to and on a common axis with said driving member, a shear pin connecting said members to transmit rotation from said driving to said driven member, the outer margin of said driven member being of noncircular form, an annular operating member having an inner margin of substantially the same noncircular form as and non-rotatably, axially slidably fitted on the outer margin of said driven member, means for axially shifting said operating member in one direction in response to rotation of said driving member relative to said driven member when said pin shears including a plurality of equally angularly spaced cams on the side of said operating member adjacent said driving member and a plurality of projections on the side of said driving member adjacent said operating member and normally respectively disposed between said cams, said cams and projections being circumferentially aligned, said cams being beveled at both ends so that said projections will ride over said cams from either end and axially shift said operating member as aforesaid when said driving member rotates relative to said driven member in either direction, and means responsive to the aforesaid axial shift of said operating member for deactuating said power means.

5. The combination defined in claim 4, wherein said projections are balls freely rotatably received in recesses in said driving member so as to ride over said cam with a rolling action.

6. The combination defined in claim 5, wherein spring means are provided urging said operating member axially in the opposite direction.

7. The combination defined in claim 6, wherein said balls project a distance equal to less than their radii from said recesses and the spacing between the adjacent sides of said driving member and operating member in the normal operation prior to shearing of said pin is less than the diameter of said balls so as to prevent said balls from falling out of their recesses.

8. The combination defined in claim 7, wherein said pin is removably received in aligned holes in said driving and driven members located so as to position each ball closely adjacent to one end of a cam, one of said driving and driven members having a second hole angularly spaced from the first-mentioned hole therein which may be aligned with said hole in the other of said driving and driven members for insertion of said pin upon relative rotation of said driving and driven members to positions such that each ball is closely adjacent to the other end of a cam.

9. In combination, a rotary driving member, power means for rotating said driving member, a rotary driven member adjacent to and on a common axis with said driving member, a shear pin connecting said members to transmit rotation from said driving to said driven member, an operating member nonrotatably, axially slidably mounted on said driven member, means for axially shifting said operating member in one direction in response to rotation of said driving member relative to said driven member when said pin shears including a cam surface on one of said driving and operating members and a ball rotatably mounted on the other, said cam surface and ball being circumferentially aligned so that said ball will ride over said cam surface with a rolling action and axially shift said operating member as aforesaid when said driving member rotates relative to said driven member, and means responsive to the aforesaid axial shift of said operating member for either deactuating said power means or actuating a signal.

10. The combination defined in claim 9, wherein said cam surface is beveled at both ends so that said ball can ride over said cam surface from either end irrespective of the direction of rotation of said driving member relative to said driven member.

References Cited

UNITED STATES PATENTS

| | | | |
|---|---|---|---|
| 2,209,155 | 7/1940 | Fagg | 192—150 |
| 2,260,769 | 10/1941 | Bonham | 192—150 X |
| 2,652,914 | 9/1953 | Christensen | 64—28 X |
| 3,103,004 | 9/1963 | Murray | 192—150 X |
| 3,282,387 | 11/1966 | Becker et al. | 192—150 |

DONLEY J. STOCKING, *Primary Examiner.*

LEONARD H. GERIN, *Assistant Examiner.*

U.S. Cl. X.R.

64—28; 192—150